(12) United States Patent
Kim et al.

(10) Patent No.: US 12,257,878 B2
(45) Date of Patent: Mar. 25, 2025

(54) INJECTION-TYPE HEAT EXCHANGE MODULE AND THERMAL MANAGEMENT SYSTEM FOR VEHICLE APPLYING THE SAME

(71) Applicants: HYUNDAI MOTOR COMPANY, Seoul (KR); KIA CORPORATION, Seoul (KR)

(72) Inventors: Jong Won Kim, Cheonan-si (KR); Sang Shin Lee, Suwon-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 297 days.

(21) Appl. No.: 17/972,179

(22) Filed: Oct. 24, 2022

(65) Prior Publication Data
US 2023/0182527 A1 Jun. 15, 2023

(30) Foreign Application Priority Data
Dec. 15, 2021 (KR) .................. 10-2021-0179799

(51) Int. Cl.
*B60H 1/00* (2006.01)
*F25B 23/00* (2006.01)
*B60H 1/32* (2006.01)

(52) U.S. Cl.
CPC ..... *B60H 1/00342* (2013.01); *B60H 1/00485* (2013.01); *B60H 1/00921* (2013.01); *F25B 23/00* (2013.01); *B60H 2001/3298* (2013.01); *F25B 2400/054* (2013.01); *F25B 2400/13* (2013.01); *F25B 2500/24* (2013.01)

(58) Field of Classification Search
CPC ........... B60H 1/00342; B60H 1/00485; B60H 1/00921; B60H 2001/3298; F25B 43/00; F25B 43/006; F25B 2400/23; F25B 2400/05; F25B 2400/051; F25B 2400/054
See application file for complete search history.

(56) References Cited

U.S. PATENT DOCUMENTS

| 5,692,394 | A | * | 12/1997 | Ozaki | F25B 13/00 62/509 |
|---|---|---|---|---|---|
| 5,799,499 | A | * | 9/1998 | Yano | F25B 41/335 62/509 |
| 6,298,687 | B1 | * | 10/2001 | Dienhart | F28D 7/024 62/513 |
| 2017/0284715 | A1 | * | 10/2017 | Mukherjee | F25B 40/00 |
| 2019/0070924 | A1 | | 3/2019 | Mancini et al. | |
| 2019/0299126 | A1 | | 10/2019 | Osaki et al. | |

\* cited by examiner

*Primary Examiner* — Jonathan Bradford
(74) *Attorney, Agent, or Firm* — MCDONNELL BOEHNEN HULBERT & BERGHOFF LLP

(57) ABSTRACT

An injection-type heat exchange module includes an outer tank connected to an external condenser or an indoor condenser and a lower chamber connected to an evaporator and a compressor, an inner tank disposed so as to exchange heat with a refrigerant in the outer tank and connected to the compressor, the evaporator, or a lower portion of the outer tank, a first valve disposed at an upper end of the inner tank, a second valve rotatably coupled to a lower end of the inner tank, and an actuator connected to the first valve and the second valve to simultaneously rotate the same. The first and second valves are configured to permit flow of, expand, or block the flow of the refrigerant by rotation thereof.

13 Claims, 14 Drawing Sheets

FIG. 3

| Mode | Case | upper end | | lower end | | Valve |
|---|---|---|---|---|---|---|
| | | EXV1 (Gas injection) | Bypass | EXV2(A/C) | EXV3 (Liquid injection) | |
| Liquid injection | 1 | × | ○ | ○ | ○ | × |
| All close | 2 | × | × | × | × | × |
| Gas injection | 3 | ○ | × | ○ | × | ○/× |
| Upper end bypass | 4 | × | ○ | × | × | × |
| A/C | 5 | × | ○ | ○ | × | × |

INJECTION-TYPE HEAT EXCHANGE MODULE AND THERMAL MANAGEMENT SYSTEM FOR VEHICLE APPLYING THE SAME

CROSS REFERENCE TO RELATED APPLICATIONS

This application claims priority from Korean Patent Application No. 10-2021-0179799, filed on Dec. 15, 2021, in the Korean Intellectual Property Office, the disclosure of which is incorporated herein by reference in its entirety.

BACKGROUND

1. Field

The present disclosure relates to an injection-type heat exchange module and a thermal management system for a vehicle applying the same, and more particularly to a thermal management system for a vehicle capable of reducing the usage of a separate heater in the initial stage of heating by utilizing a heat exchange module for heat exchange between circulating refrigerant and energy consumed by a compressor during heating.

2. Description of the Related Art

Recently, the number of eco-friendly vehicles such as electric vehicles has increased due to environmental concerns regarding vehicles having internal combustion engines. However, in the case of vehicles having internal combustion engines of the related art, since the interior of such a vehicle can be heated using waste heat of an engine, separate energy for heating is not required. In the case of electric vehicles, since an engine is not provided therein, there is no heat source. As a result, heating is performed using additional energy, which leads to a problem of deteriorated fuel efficiency. Further, the above-mentioned problem causes an inconvenience in that the mileage of electric vehicles is reduced and recharging is required more frequently.

Meanwhile, in electric vehicles, it is additionally required to perform thermal management of electrical components such as a high-voltage battery and a motor, as well as the interior of the vehicle. That is, in the case of electric vehicles, since an indoor space, a battery, and an electrical component have different requirements for air conditioning, there is need for a technique capable of satisfying the individual requirements while saving as much energy as possible. Accordingly, provided is the concept of integrated thermal management for a vehicle in which thermal management is performed independently for each component and overall vehicle thermal management operations are integrated, thereby improving thermal efficiency.

In order to perform the integrated thermal management for the vehicle, it is required to integrate and modularize complicated coolant lines and components. Accordingly, multiple components are required to be modularized, and compact modularization is required in order to realize simple manufacturing and a simple package.

Meanwhile, recently, research on increasing the efficiency of a heat pump in electric vehicles has been performed. One of the methods of increasing the efficiency of a heat pump is to use a gas-injection-type heat pump.

The gas-injection-type heat pump uses a heat exchanger (H/X) and an accumulator to increase the rate of flow of a refrigerant circulating during heating, thereby increasing the heating efficiency of the vehicle.

However, the method of the related art using the heat exchanger and the accumulator has a problem in that the heat exchanger and the accumulator are separately provided, and multiple expansion valves are required to be individually controlled.

The information disclosed in this Background section is only for enhancement of understanding of the general background of the disclosure, and should not be taken as an acknowledgement or any form of suggestion that this information forms the related art already known to a person skilled in the art.

SUMMARY

Therefore, the present disclosure has been made in view of the above problems, and it is an object of the present disclosure to provide technology of applying gas injection and liquid injection to a refrigeration cycle using a heat exchange module in which a heat exchanger and a flash tank are integrated.

In accordance with an aspect of the present disclosure, the above and other objects can be accomplished by the provision of an injection-type heat exchange module including an outer tank formed of an upper chamber and a lower chamber separated from each other, the upper chamber being connected to an external condenser or an indoor condenser from which a refrigerant flows thereinto, and the lower chamber being connected to an evaporator from which the refrigerant flows thereinto and being connected to a compressor from which the refrigerant is discharged, an inner tank disposed so as to exchange heat with the refrigerant in the outer tank and connected to the compressor, the evaporator, or a lower portion of the outer tank to discharge the refrigerant thereto, a first valve disposed at an upper end of the inner tank and configured to cause the refrigerant in the upper chamber of the outer tank to be expanded in the inner tank and to permit or block flow of refrigerant by rotation thereof, a second valve rotatably coupled to a lower end of the inner tank and configured to cause the refrigerant in the inner tank to be expanded by the evaporator and to permit or block flow of refrigerant by rotation thereof, the second valve also causing the refrigerant to be expanded by the lower chamber of the outer tank or blocking the refrigerant by rotation thereof, and an actuator connected to the first valve and the second valve and configured to simultaneously rotate the first valve and the second valve.

The inner tank may be disposed so as to simultaneously exchange heat with the refrigerant in the upper and lower chambers of the outer tank.

The inner tank may be formed to enlarge a surface area of a part or all of the outer surface thereof.

The inner tank may be connected to the compressor at an upper portion thereof so as to discharge the gaseous refrigerant to the compressor, and may be connected to the evaporator at a lower portion thereof so as to discharge the liquid refrigerant to the evaporator.

The lower chamber of the outer tank may be connected to the compressor at an upper portion thereof so as to discharge the gaseous refrigerant to the compressor.

The first valve may include a rotary blade hole and a rotary flow hole formed therein, the inner tank may include a fixing hole formed at an upper end thereof, and a position of the fixing hole relative to the rotary blade hole and the rotary flow hole may be changed when the first valve is rotated relative to the inner tank.

The second valve may include a rotary blade hole and a rotary expansion hole formed therein, the inner tank may include an injection hole communicating with the lower chamber of the outer tank and a cooling hole communicating with the evaporator formed at a lower end thereof, and a position of the injection hole and the cooling hole relative to the rotary blade hole and the rotary expansion hole may be changed when the second valve is rotated relative to the inner tank.

The rotary blade hole may extend in a circumferential direction of the first valve or the second valve and may have an open area that is enlarged or reduced upon extending.

At a position where the first valve causes the refrigerant in the upper chamber of the outer tank to flow into the inner tank, the second valve may cause the lower chamber of the outer tank and the evaporator to simultaneously expand the refrigerant in the inner tank through an injection hole communicating with the lower chamber of the outer tank and a cooling hole communicating with the evaporator, may cause the evaporator to expand the refrigerant in the inner tank through the cooling hole in a state in which the lower chamber of the outer tank is blocked, or may cause the lower chamber of the outer tank and the evaporator to be simultaneously blocked.

At a position where the first valve causes the refrigerant in the upper chamber of the outer tank to be expanded in the inner tank, the second valve may cause the evaporator to expand the refrigerant in the inner tank through a cooling hole communicating with the evaporator.

In accordance with another aspect of the present disclosure, there is provided a thermal management system for a vehicle to which the injection-type heat exchange module of the present disclosure is applied, the thermal management system including a first refrigerant line through which the refrigerant flows from the inner tank and the lower chamber of the outer tank to the indoor condenser via the compressor, a second refrigerant line configured to branch from the inner tank to the evaporator and the external condenser to allow the refrigerant to flow thereto, a third refrigerant line through which the refrigerant flows from a chiller or the evaporator to the lower chamber of the outer tank, and a fourth refrigerant line through which the refrigerant flows from the external condenser and the indoor condenser to the upper chamber of the outer tank.

The thermal management system may further include a controller configured to control operation of the compressor and to control rotation of the actuator to permit flow of, expand, or block the flow of the refrigerant in the first valve and the second valve.

The controller may control, in a gas injection mode, the actuator so that the first valve causes the refrigerant in the upper chamber of the outer tank to be expanded in the inner tank, and the second valve causes the evaporator to expand the refrigerant in the inner tank through a cooling hole communicating with the evaporator.

The controller may control, in a liquid injection mode, the actuator so that the first valve causes the refrigerant in the upper chamber of the outer tank to flow into the inner tank, and the second valve causes the lower chamber of the outer tank and the evaporator to simultaneously expand the refrigerant in the inner tank through an injection hole communicating with the lower chamber of the outer tank and a cooling hole communicating with the evaporator.

BRIEF DESCRIPTION OF THE FIGURES

The above and other objects, features and other advantages of the present disclosure will be more clearly understood from the following detailed description taken in conjunction with the accompanying drawings, in which:

FIG. 3 is a table showing open states of a first valve and a second valve according to various control modes of the injection-type heat exchange module according to the embodiment of the present disclosure;

DETAILED DESCRIPTION

Figure 1:
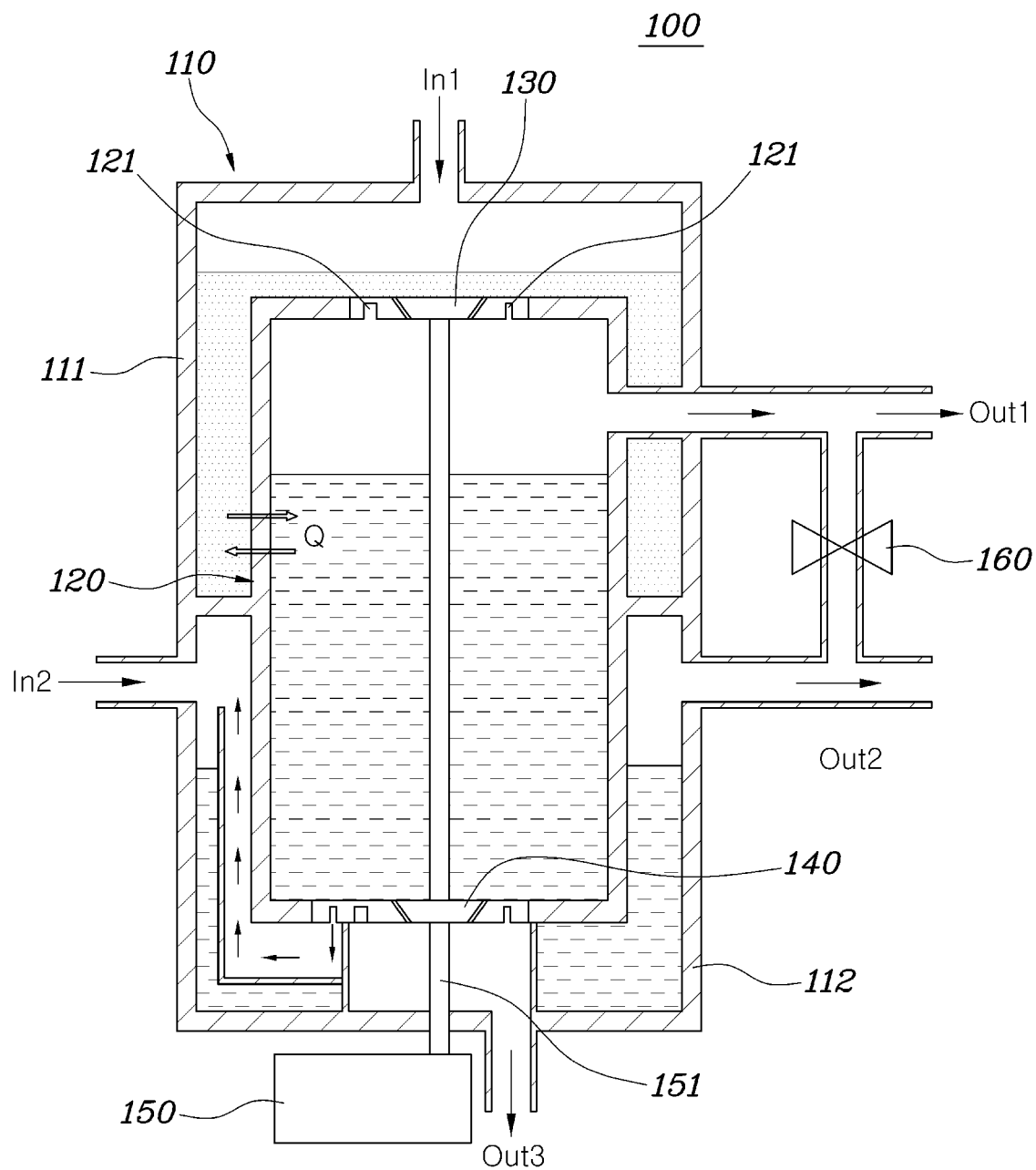
FIG. 1 is a block diagram of an injection-type heat exchange module according to an embodiment of the present disclosure.

Specific structural or functional descriptions in the embodiments of the present disclosure disclosed in this specification or application are merely illustrative for the purpose of describing embodiments according to the present disclosure. Further, the present disclosure may be implemented in various forms, and should not be construed as being limited to the embodiments described in this specification or application.

Since the embodiments according to the present disclosure may have various modifications and may have various forms, specific embodiments are illustrated in the drawings and described in detail in this specification or application. However, it should be understood that the embodiments according to the concept of the present disclosure are not intended to be limited to specific disclosed forms, and include all modifications, equivalents, and substitutes included in the spirit and technical scope of the present disclosure.

Meanwhile, in the present disclosure, terms such as "first" and/or "second" may be used to describe various components, but the components are not limited by the terms. The terms are used only for the purpose of distinguishing one component from other components. For example, a first component may be referred to as a second component, and similarly, a second component may also be referred to as a first component without departing from the scope of rights according to the concept of the present disclosure.

When one component is referred to as being "connected" or "joined" to another component, the one component may be directly connected or joined to the other component, but it should be understood that other components may be present therebetween. On the other hand, when the one component is referred to as being "directly connected to" or "directly in contact with" the other component, it should be understood that other components are not present therebetween. Other expressions for the description of a relationship between components, that is, "between" and "directly between" or "adjacent to" and "directly adjacent to", should be interpreted in the same manner.

The terms used in the specification are only used to describe specific embodiments, and are not intended to limit the present disclosure. In this specification, an expression in a singular form also includes the plural form, unless otherwise clearly specified in context. It should be understood that expressions such as "comprise" and "have" in this specification are intended to designate the presence of embodied features, numbers, steps, operations, components, parts, or combinations thereof, but do not exclude the presence or addition of one or more other features, numbers, steps, operations, components, parts, or combinations thereof.

Unless otherwise defined, all terms used herein, including technical and scientific terms, have the same meanings as those commonly understood by those skilled in the art to which the present disclosure pertains. Terms such as those defined in commonly used dictionaries should be interpreted as having meanings consistent with their meanings in the context of the related technology. Further, unless explicitly defined in this specification, the above-mentioned terms should not be interpreted in an ideal or overly formal sense.

Hereinafter, the present disclosure will be described in detail by describing preferred embodiments thereof with reference to the accompanying drawings. The same reference numerals in each drawing represent the same members.

In order to improve the performance of a refrigeration cycle, research on application of an ejector or an injector is being actively discussed.

A refrigeration cycle, to which an ejector of the related art is applied, has a structure in which a refrigerant condensed in a condenser flows to a gas-liquid separator with a compression recovery function utilizing a venturi effect of the ejector, and a liquid refrigerant circulates while passing through an expansion valve and an evaporator. Accordingly, power consumption (work) by a compressor is reduced, and a refrigerant flow rate is increased compared to a general refrigeration cycle.

However, the refrigeration cycle to which the ejector of the related art is applied has a problem in that it is difficult to secure a higher refrigerant flow rate in a low-temperature state.

In the case of a refrigeration cycle to which injection is applied, the same is divided into gas injection and liquid injection.

In the refrigeration cycle to which gas injection is applied, the refrigerant flows to the evaporator through a two-stage expansion process, and a primarily expanded gaseous refrigerant having medium pressure is injected into the compressor. Accordingly, it is possible to increase the flow rate of the refrigerant flowing to an external condenser, an indoor condenser, and the compressor and to improve a compression effect by two-stage compression, thereby having an effect of reducing power consumption by the compressor. Particularly, it is possible to solve deterioration in the performance of the refrigeration cycle in cold regions and tropical regions.

Meanwhile, the refrigeration cycle to which the liquid injection is applied prevents overheating of the compressor and absorbs the amount of heat consumption of the compressor, thereby having an effect of further increasing the flow rate of the refrigerant.

Specifically, in the case of a heat exchanger, some of the refrigerant is separated at a rear end of the external condenser or the indoor condenser and undergoes heat exchange with a primarily expanded refrigerant at medium pressure. Accordingly, the separated refrigerant is vaporized and secondarily expanded to reduce dryness of the refrigerant flowing into the evaporator.

In addition, in the case of the gas-liquid separator type, after all of the refrigerant is expanded at the rear end of the external condenser or the indoor condenser, the gaseous refrigerant and the liquid refrigerant are separated and flow to the compressor and a secondary expansion valve, respectively. Accordingly, the liquid refrigerant is separated and secondarily expanded, thereby reducing the dryness of the refrigerant flowing into the evaporator.

Figure 2:
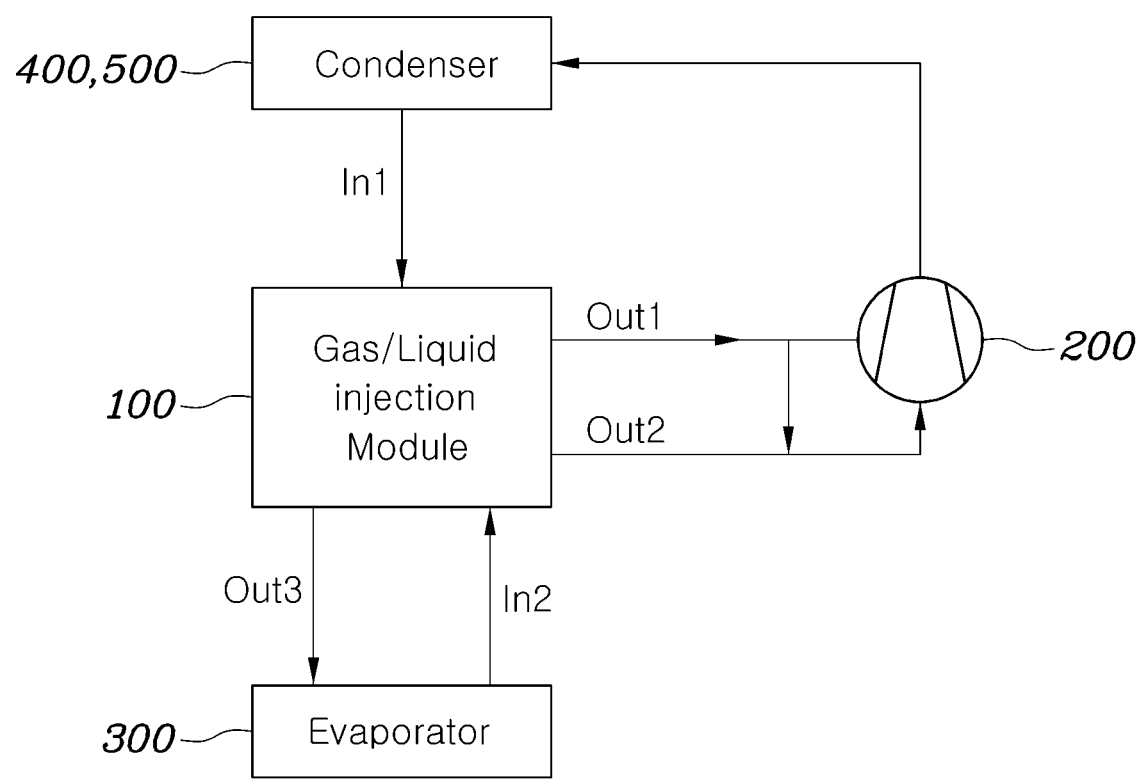
FIG. 2 is a circuit diagram of a thermal management system to which the injection-type heat exchange module according to the embodiment of the present disclosure is applied.

FIG. 1 is a block diagram of an injection-type heat exchange module 100 according to an embodiment of the present disclosure, and FIG. 2 is a circuit diagram of a thermal management system to which the injection-type heat exchange module 100 according to the embodiment of the present disclosure is applied.

Referring to FIGS. 1 and 2, the injection-type heat exchange module 100 according to the embodiment of the present disclosure includes an outer tank 110 formed of an upper chamber 111 and a lower chamber 112 separated from each other, the upper chamber 111 being connected to an external condenser 500 or an indoor condenser 400 from which a refrigerant flows thereinto, and the lower chamber 112 being connected to an evaporator 300 from which the refrigerant flows thereinto and being connected to a compressor 200 from which the refrigerant is discharged, an inner tank 120 disposed so as to exchange heat with the refrigerant in the outer tank 110 and connected to the compressor 200, the evaporator 300, or a lower portion of the outer tank 110 to discharge the refrigerant thereto, a first valve 130 disposed at an upper end of the inner tank 120 and configured to cause the refrigerant in the upper chamber 111 of the outer tank 110 to be expanded in the inner tank 120 and to permit or block the flow of refrigerant by rotation thereof, a second valve 140 rotatably coupled to a lower end of the inner tank 120 and configured to cause the refrigerant in the inner tank 120 to be expanded by the evaporator 300 and to permit or block the flow of refrigerant by rotation thereof, the second valve 140 also causing the refrigerant to be expanded by the lower chamber 112 of the outer tank 110 or blocking the refrigerant by rotation thereof, and an actuator 150 connected to the first valve 130 and the second valve 140 and configured to simultaneously rotate the first valve 130 and the second valve 140.

Specifically, the injection-type heat exchange module 100 according to the embodiment of the present disclosure may be a module configured to integrate a flash tank or an accumulator, a heat exchanger H/X, and an expansion valve EXV, in which a primarily expanded refrigerant is expanded again and the gaseous refrigerant is separated from the liquid refrigerant. Particularly, the operation of three expansion valves may be controlled by one actuator 150.

As will be described later, the injection-type heat exchange module 100 is controlled in a gas injection mode to increase the flow rate of the refrigerant circulating during heating, thereby improving the heating efficiency of a vehicle and the efficiency of a heat pump. In addition, the injection-type heat exchange module 100 is controlled in a liquid injection mode to increase the flow rate of the refrigerant during cooling in hot weather, thereby improving cooling efficiency of the vehicle. Further, it is possible to improve the heating and cooling efficiency of the vehicle through heat exchange between the refrigerant in the injection-type heat exchange module 100.

The outer tank 110 may be formed by dividing the same into the upper chamber 111 and the lower chamber 112.

Particularly, the refrigerant may flow into the upper chamber 111 of the outer tank 110 from the external condenser 500 or the indoor condenser 400 and may be discharged to the inner tank 120 through the first valve 130. As shown in the drawing, the first valve 130 may be provided on a partition wall between the upper chamber 111 of the outer tank 110 and the lower chamber 112 thereof.

The inner tank 120 may be located inside the outer tank 110. Particularly, the inner tank 120 may be located inside the outer tank 110 so as to extend over the upper chamber 111 of the outer tank 110 and the lower chamber 112 thereof. The inner tank 120 may be disposed so as to exchange heat with the refrigerant inside the upper chamber 111 of the outer tank 110. The inner tank 120 may be made of a material having high thermal conductivity, such as copper, aluminum, or an alloy. Particularly, the heat of the refrigerant discharged from the upper chamber 111 of the outer tank 110 may be transferred into the refrigerant discharged to the inner tank 120 through the first valve 130, and the heat of the refrigerant inside the lower chamber 112 of the outer tank 110 may be absorbed into the refrigerant inside the inner tank 120. In this manner, heat exchange is performed therebetween.

The refrigerant may flow into the inner tank 120 from the upper chamber 111 of the outer tank 110 through the first valve 130, and the refrigerant flowing thereinto may be discharged to the compressor 200 or may be discharged to the evaporator 300 or to the lower chamber 112 of the outer tank 110 through the second valve 140.

The compressor 200 is configured to compress the absorbed refrigerant and to convert the same to refrigerant having high pressure. Here, the compressor 200 adopts a gas injection-type compressor for two-stage compression, in which an inlet port, through which a refrigerant is introduced, and an injection port, through which a gaseous refrigerant having intermediate pressure is injected into a compression intermediate area, are formed to mix the separate volumes of refrigerant.

The indoor condenser 400 is installed in an interior air-conditioning device of a vehicle, and is a means configured to heat the interior of the vehicle by performing heat exchange between a compressed refrigerant passing through the indoor condenser and air supplied to the interior of the vehicle and by radiating the heat of the refrigerant to the air supplied to the interior of the vehicle.

The first valve 130 and the second valve 140 allow and block the flow of the refrigerant, to cause the refrigerant to flow (bypass) as it is, or to adjust an opening degree thereof to expand the refrigerant.

The evaporator 300 is configured to allow heat exchange between the refrigerant and the air recirculating in the interior space of the vehicle, and to serve to increase the temperature of the refrigerant by absorbing heat from the air recirculating in the interior space of the vehicle.

The first valve 130 is disposed at the upper end of the inner tank 120, and particularly, may be located between the upper chamber 111 of the outer tank 110 and the inner tank 120. In addition, the first valve 130 is rotated with respect to the upper end of the inner tank 120, thereby causing the refrigerant in the upper chamber 111 of the outer tank 110 to be expanded in the inner tank 120, to flow to the inner tank 120, or to be blocked.

The second valve 140 is disposed at the lower end of the inner tank 120 and is located between the inner tank 120 and the lower chamber 112 of the outer tank 110. Further, the second valve 140 is rotated with respect to the lower end of the inner tank 120, thereby causing the refrigerant in the inner tank 120 to be expanded by the evaporator 300, to flow to the evaporator 300, or to be blocked. Additionally, the second valve 140 is located between the inner tank 120 and the evaporator 300 and is rotated with respect to the lower end of the inner tank 120, thereby causing the refrigerant therein to be expanded by the lower chamber 112 of the outer tank 110 or to be blocked.

The actuator 150 is connected to the first valve 130 and the second valve 140. The actuator 150 may be operated to simultaneously rotate the first valve 130 and the second valve 140 by rotating a shaft 151 configured to connect the first valve 130 and the second valve 140, which are disposed so as to be spaced apart from each other. The actuator 150 may be operated by a controller 600 to be described later.

That is, the injection-type heat exchange module 100 according to the embodiment of the present disclosure is a module in which a heat exchanger and a flash tank are integrated. Particularly, the injection-type heat exchange module 100 includes a valve configured to expand the refrigerant or to adjust the flow of the same using one actuator 150, thereby simplifying a system configuration and obtaining an efficient effect.

More specifically, the inner tank 120 may be disposed so as to exchange heat with the refrigerant in each of the upper chamber 111 of the outer tank 110 and the lower chamber 112 thereof. That is, the inner tank 120 extends in a vertical direction, a part of the inner tank 120 may be located inside the upper chamber 111 of the outer tank 110, and the remaining part thereof may be located inside the lower chamber 112 thereof.

In addition, the inner tank 120 may be formed to have a structure in which a surface area of a part or all of the outer surface thereof is enlarged.

In the embodiment, the outer surface of the inner tank 120 may have a plurality of dimples or flow grooves formed therein to enlarge the surface area thereof, thereby boosting the heat exchange with the refrigerant inside the outer tank 110.

Particularly, in order to boost the heat exchange between the inner tank 120 and the liquid refrigerant stored in the upper chamber 111 of the outer tank 110 and the lower chamber 112 thereof, among the outer surfaces of the inner tank 120, a lower surface of the inner tank 120 and upper and lower portions of the outer peripheral surface thereof, which are in contact with the liquid refrigerant, may have enlarged surface areas.

The inner tank 120 may be connected to the compressor 200 at an upper portion thereof so that the gaseous refrigerant therein is discharged to the compressor 200, and may be connected to the evaporator 300 at a lower portion thereof so that the liquid refrigerant therein is discharged to the evaporator 300 or to the lower chamber 112 of the outer tank 110.

That is, the gaseous refrigerant and the liquid refrigerant coexist in the inner tank 120. Here, the gaseous refrigerant, having a relatively low specific gravity, may be discharged from the upper portion of the inner tank 120 to the compressor 200, and the liquid refrigerant, having a relatively high specific gravity, may be discharged from the lower portion of the inner tank 120 to the evaporator 300 or the lower chamber 112 of the outer tank 110.

Further, the lower chamber 112 of the outer tank 110 may be connected to the compressor 200 at an upper portion thereof so that the gaseous refrigerant is discharged to the compressor 200.

The gaseous refrigerant and the liquid refrigerant also coexist in the lower chamber 112 of the outer tank 110. Here, the gaseous refrigerant, having a relatively low specific gravity, may be discharged to the compressor 200 at the upper portion of the lower chamber 112 of the outer tank 110.

That is, the compressor 200 may be connected to the upper portion of the inner tank 120 and the lower chamber 112 of the outer tank 110, and as such, the refrigerant respectively discharged therefrom is discharged to the compressor 200. In addition, passages, through which the upper portion of the inner tank 120 and the lower chamber 112 of the outer tank 110 are respectively connected to the compressor 200, may communicate with each other, and a shut-off valve 160 may be further provided at a location where the passages communicate with each other.

FIG. 3 is a table showing the open states of the first valve 130 and the second valve 140 according to various control modes of the injection-type heat exchange module 100 according to the embodiment of the present disclosure, and FIGS. 4 to 8 are views showing the open states of the first valve 130 and the second valve 140 according to various control modes of the present disclosure.

Referring to FIGS. 3 to 8, the first valve 130 includes a rotary blade hole 131 and a rotary flow hole 132 respectively formed therein, and a fixing hole 121 is formed at the upper end of the inner tank 120. Here, as the first valve 130 is rotated relative to the inner tank 120, a position of the fixing hole 121 relative to the rotary blade hole 131 and the rotary flow hole 132 may be changed.

In addition, the second valve 140 includes a rotary blade hole 141 and a rotary expansion hole 142 respectively formed therein, and an injection hole 122 communicating with the lower chamber 112 of the outer tank 110 and a cooling hole 123 communicating with the evaporator 300 are formed at the lower end of the inner tank 120. Here, as the second valve 140 is rotated relative to the inner tank 120, a position of the injection hole 122 and the cooling hole 123 relative to the rotary blade hole 141 and the rotary expansion hole 142 may be changed.

Particularly, the injection hole 122 may allow the inside of the inner tank 120 to communicate with the lower chamber 112 of the outer tank 110, and the cooling hole 123 may allow the inside of the inner tank 120 to communicate with the evaporator 300. The rotary blade hole 141 may permit the flow of fluid or may adjust expansion thereof depending on the relative position between the same and the injection hole 122 or the cooling hole 123. Further, the rotary expansion hole 142 may adjust the expansion of fluid depending on the relative position between the same and the injection hole 122 or the cooling hole 123.

That is, when the position of each of the rotary blade hole 131 and the rotary flow hole 132 of the first valve 130 or the rotary blade hole 141 and the rotary expansion hole 142 of the second valve 140 coincides with the position of the fixing hole 121 formed at the upper end of the inner tank 120 or the injection hole 122 or the cooling hole 123 formed at the lower end of the inner tank 120, the flow or expansion of the fluid may be permitted. On the other hand, when the relative positions therebetween do not coincide with each other, the flow or expansion of the fluid may not be permitted.

The first valve 130 may include the rotary blade hole 131 and the rotary flow hole 132 respectively formed therein, and the inner tank 120 may include the fixing hole 121 formed at the upper end thereof. Here, when the first valve 130 is rotated relative to the inner tank 120, the relative position between the rotary blade hole 131, the rotary flow hole 132, and the fixing hole 121 may be changed.

The inner tank 120 may include a plurality of fixing holes 121 formed at the upper end thereof at positions spaced apart from each other in a circumferential direction thereof, and the first valve 130 may have the rotary blade hole 131 and the rotary flow hole 132 spaced apart from each other in a circumferential direction thereof. In one embodiment, the plurality of fixing holes 121 may be disposed to be spaced apart from each other at an angle of 180 degrees in the circumferential direction, and the rotary blade hole 131 and the rotary flow hole 132 of the first valve 130 may be spaced apart from each other at an angle of 90 degrees or less.

The inner tank 120 may include the injection hole 122 and the cooling hole 123 formed at the lower end thereof and spaced apart from each other in the circumferential direction, and the second valve 140 may include the rotary blade hole 141 and the rotary expansion hole 142 spaced apart from each other in the circumferential direction. In one embodiment, a plurality of cooling holes 123 may be provided, and the injection holes 122 may be disposed so as to be spaced apart from any one of the plurality of cooling holes 123 by 90 degrees in the circumferential direction. In addition, the rotary blade hole 141 and the rotary expansion hole 142 of the second valve 140 are spaced apart from each other by the extended radius of the rotary expansion hole 142, that is, by more than 90 degrees. Accordingly, the second valve 140 may be disposed so that the rotary expansion hole 142 is blocked at a rotational position where the rotary blade hole 141 coincides with the injection hole 122 or the cooling hole 123.

The rotary blade hole 131 and the rotary flow hole 132 of the first valve 130 are rotated with respect to the upper end of the inner tank 120, thereby permitting or blocking the flow or expansion of the fluid depending on the relative positions between the same and the plurality of fixing holes 121. Further, the rotary blade hole 141 and the rotary expansion hole 142 of the second valve 140 are rotated with respect to the lower end of the inner tank 120, thereby permitting or blocking the flow or expansion of the fluid depending on the relative positions between the same and the injection hole 122 and the cooling hole 123.

Figure 4:
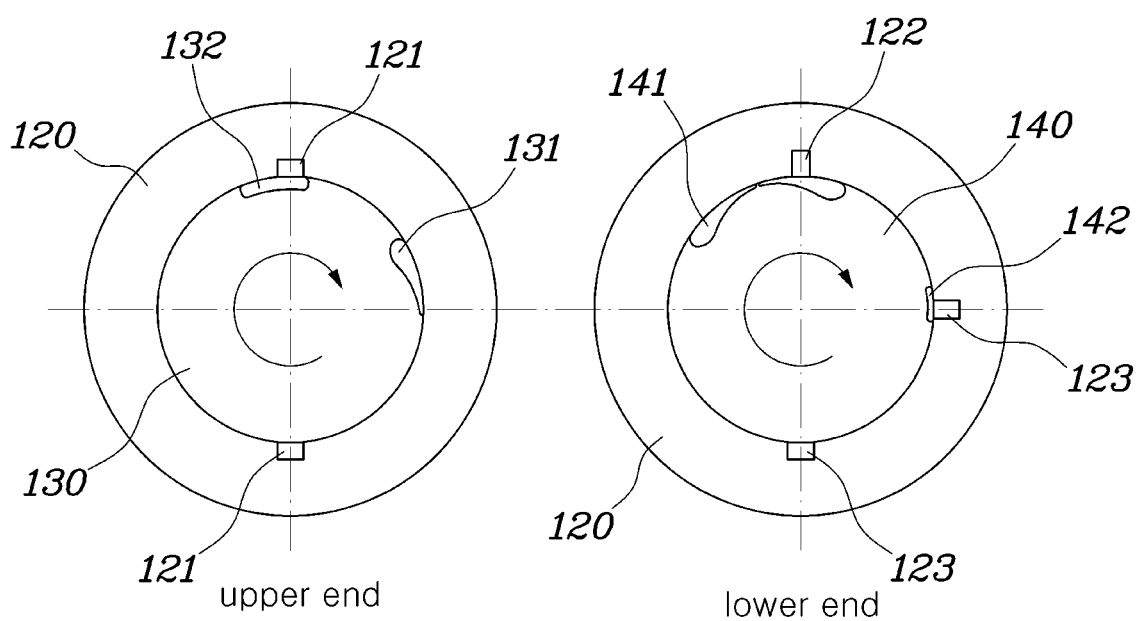
FIGS. 4, 5, 6, 7, and 8 are views showing the open states of the first valve and the second valve according to various control modes of the present disclosure.

Specifically, as shown in FIG. 4, in a liquid injection mode, the first valve 130 may be rotated so that the rotary blade hole 131 is blocked and the rotary flow hole 132 coincides with the fixing hole 121 at the upper end of the inner tank 120, and the second valve 140 may be rotated so that an expansion section of the rotary blade hole 141 coincides with the injection hole 122 at the lower end of the inner tank 120 and the rotary expansion hole 142 also coincides with the cooling hole 123. Accordingly, in the liquid injection mode, the refrigerant may be bypassed through the fixing hole 121 at the upper end of the inner tank 120, and the refrigerant may be expanded in the injection hole 122 and the cooling hole 123 at the lower end of the inner tank 120.

Figure 5:
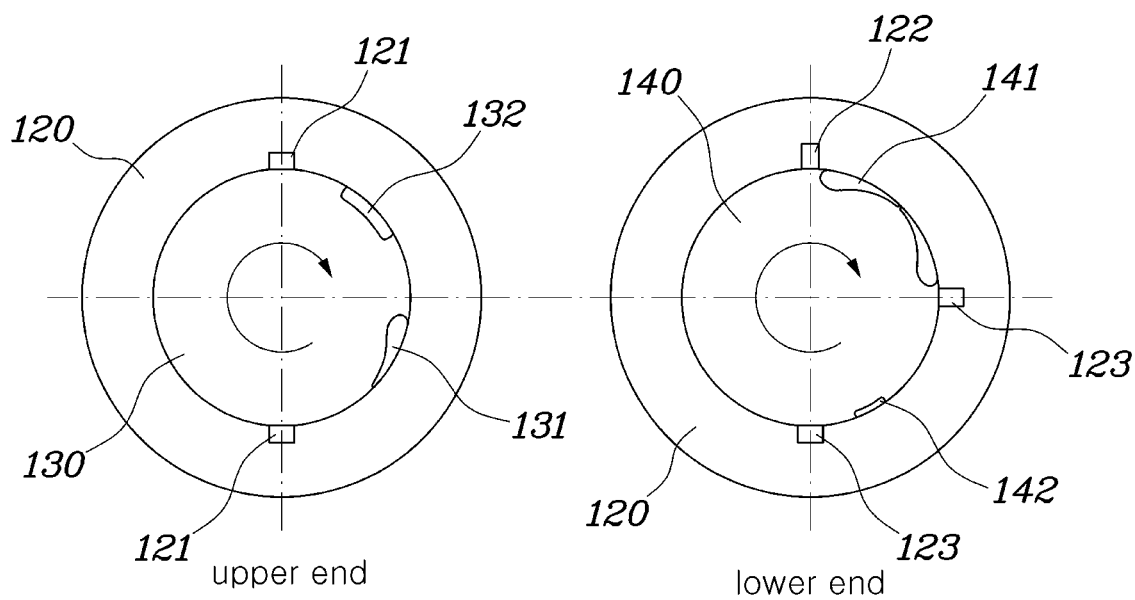

Additionally, as shown in FIG. 5, the first valve 130 and the second valve 140 may be rotated so that the rotary blade hole 131 and the rotary flow hole 132 of the first valve 130 are blocked and the rotary blade hole 141 and the rotary expansion hole 142 of the second valve 140 are blocked. Accordingly, the flow of the refrigerant in the fixing hole 121 at the upper end of the inner tank 120 may be blocked, and the flow of the refrigerant in the injection hole 122 and the cooling hole 123 at the lower end of the inner tank 120 may also be blocked.

Figure 6:
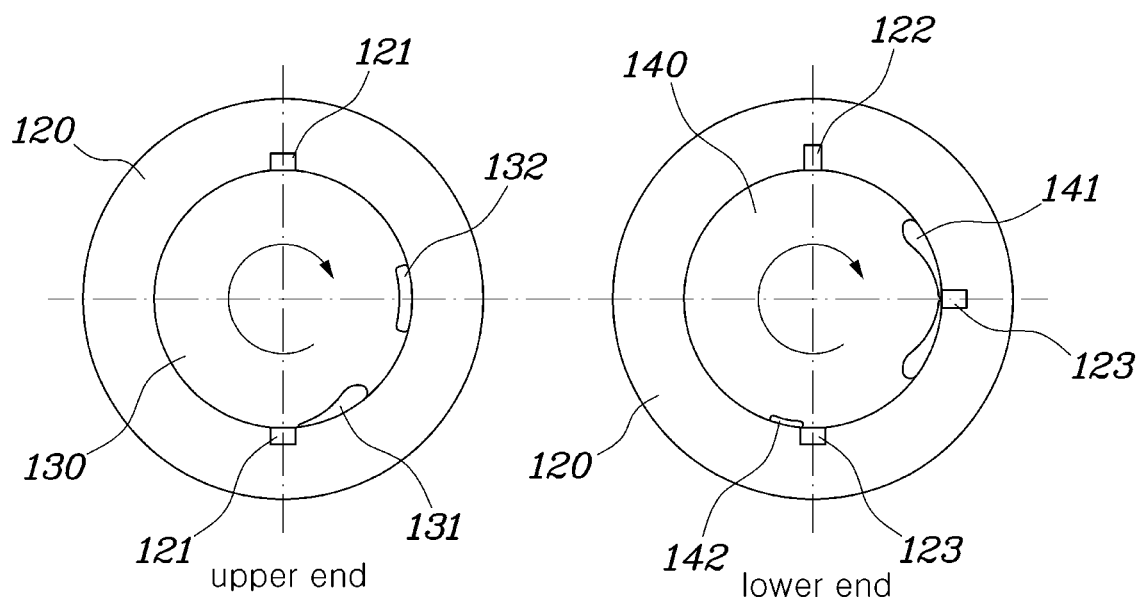

As shown in FIG. 6, in a gas injection mode, the first valve 130 and second valve 140 may be rotated so that the expansion section of the rotary blade hole 131 in the first valve 130 coincides with the fixing hole 121 at the upper end of the inner tank 120 and the expansion section of the rotary blade hole 141 in the second valve 140 coincides with the cooling hole 123 at the lower end of the inner tank 120. Accordingly, in the gas injection mode, the refrigerant may be expanded in the fixing hole 121 at the upper end of the inner tank 120, the refrigerant may be expanded in the cooling hole 123 at the lower end of the inner tank 120, and the injection hole 122 at the lower end of the inner tank 120 may be blocked. Here, the shut-off valve 160 may be opened to permit the flow of fluid or may be closed to block the flow of fluid.

Figure 7:
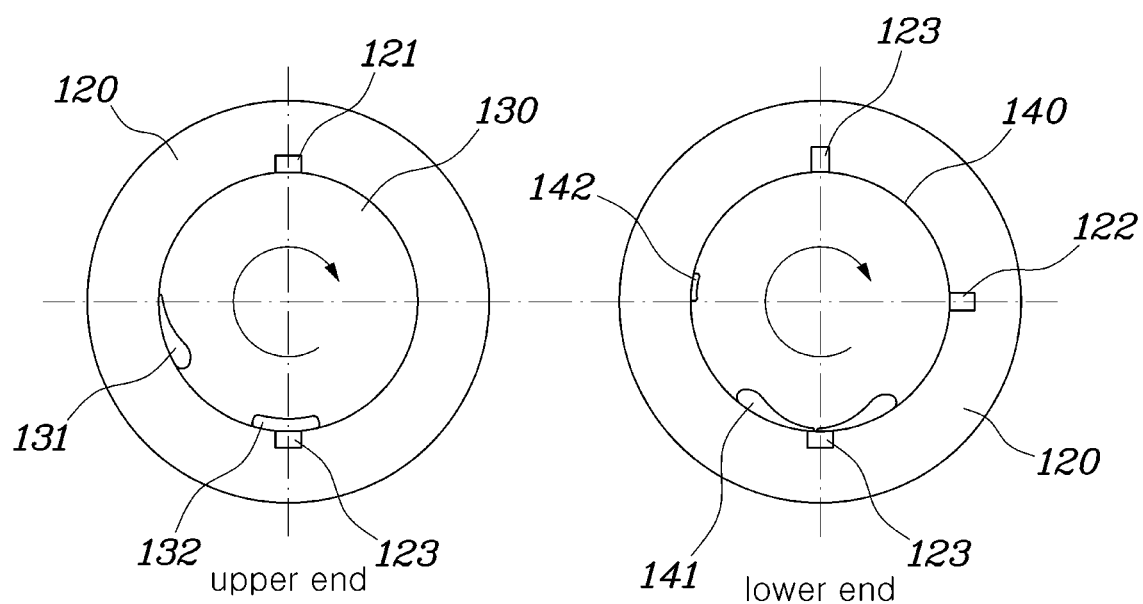

As shown in FIG. 7, in an upper end bypass mode, the first valve 130 and the second valve 140 may rotate so that the rotary flow hole 132 of the first valve 130 coincides with the fixing hole 121 at the upper end of the inner tank 120, and a blocking section of the rotary blade hole 141 of the second valve 140 coincides with the cooling hole 123 at the lower end of the inner tank 120. Accordingly, in the upper end bypass mode, the flow of refrigerant through the fixing hole 121 at the upper end of the inner tank 120 may be permitted, and the flow of refrigerant through the cooling hole 123 and the injection hole 122 at the lower end of the inner tank 120 may be blocked.

Figure 8:
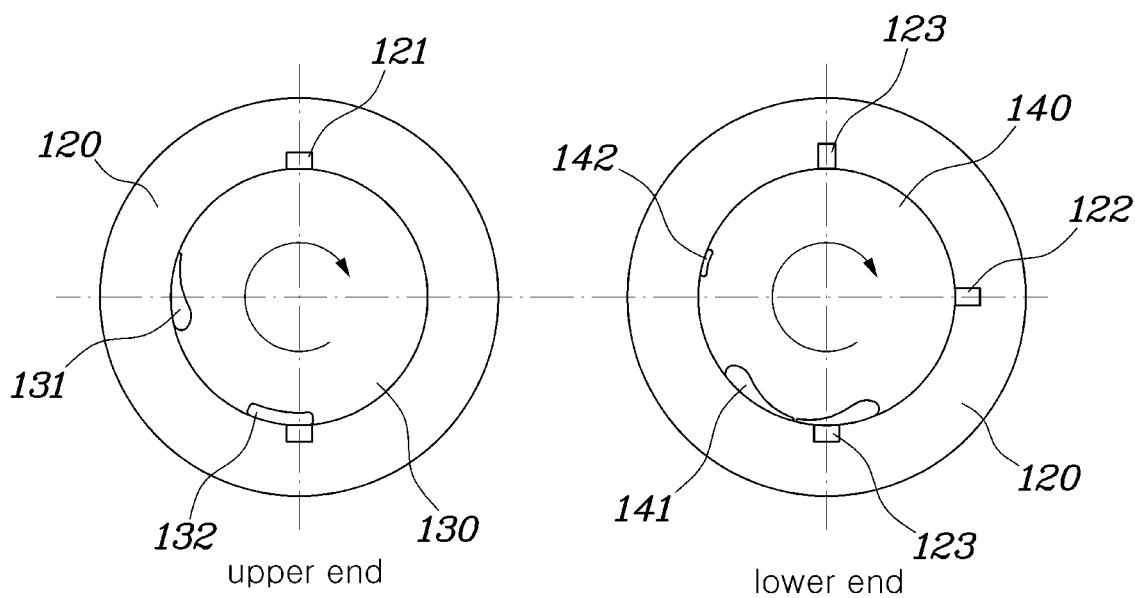

As shown in FIG. 8, in an A/C expansion mode, the first valve 130 and the second valve 140 may rotate so that the rotary flow hole 132 in the first valve 130 coincides with the fixing hole 121 at the upper end of the inner tank 120, and the expansion section of the rotary blade hole 141 of the second valve 140 coincides with the cooling hole 123 at the lower end of the inner tank 120. Accordingly, in the A/C expansion mode, the flow of the refrigerant through the fixing hole 121 at the upper end of the inner tank 120 may be permitted, and the refrigerant may be expanded when flowing through the cooling hole 123 at the lower end of the inner tank 120.

To summarize, at a position where the first valve 130 causes the refrigerant in the upper chamber 111 of the outer tank 110 to flow into the inner tank 120 (FIGS. 3, 7, and 8), the second valve 140 causes the lower chamber 112 of the outer tank 110 and the evaporator 300 to simultaneously expand the refrigerant in the inner tank 120 through the injection hole 122 communicating with the lower chamber 112 of the outer tank 110 and the cooling hole 123 communicating with the evaporator 300 (FIG. 3), causes the evaporator 300 to expand the refrigerant in the inner tank 120 through the cooling hole 123 in the state in which the lower chamber 112 of the outer tank 110 is blocked (FIG. 8), or causes the lower chamber 112 of the outer tank 110 and the evaporator 300 to be simultaneously blocked (FIG. 7).

In addition, at a position where the first valve 130 causes the refrigerant in the upper chamber 111 of the outer tank 110 to be expanded in the inner tank 120, the second valve 140 may cause the evaporator 130 to expand the refrigerant in the inner tank 120 through the cooling hole 123 communicating with the evaporator 130 (Case 3).

FIGS. 9 to 12 are views showing the rotary blade holes 131 and 141, the rotary flow hole 132, and the rotary expansion hole 142 according to the embodiment of the present disclosure.

Figure 9:
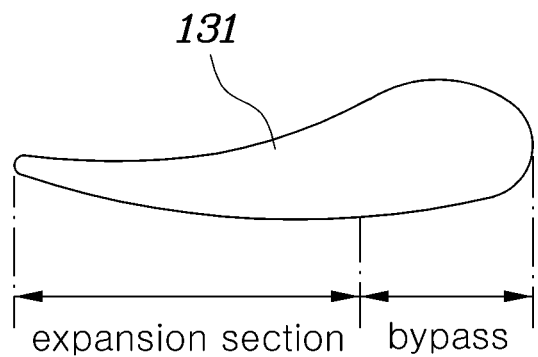
FIGS. 9, 10, 11, and 12 are views respectively showing a rotary blade hole, a rotary flow hole, and a rotary expansion hole according to the embodiment of the present disclosure.

As shown in FIG. 9, the rotary blade hole 131 of the first valve 130 may extend in a circumferential direction of the first valve 130, and as the same extends, an open area thereof may be enlarged or reduced. In detail, the rotary blade hole 131 may be divided into an expansion section, in which the open area is relatively reduced in a direction in which the rotary blade hole 131 extends, and a bypass section, in which the open area is relatively enlarged in that direction.

Figure 10:
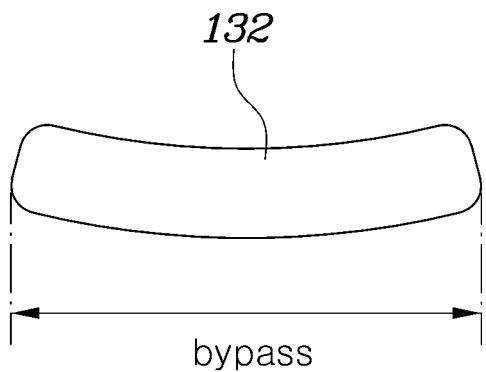

In addition, as shown in FIG. 10, the rotary flow hole 132 may extend in the circumferential direction of the first valve 130, and an open area thereof extending in the circumferential direction may have a uniform shape. Particularly, the entire area of the rotary flow hole 132 extending in the circumferential direction may be a bypass section.

Figure 11:
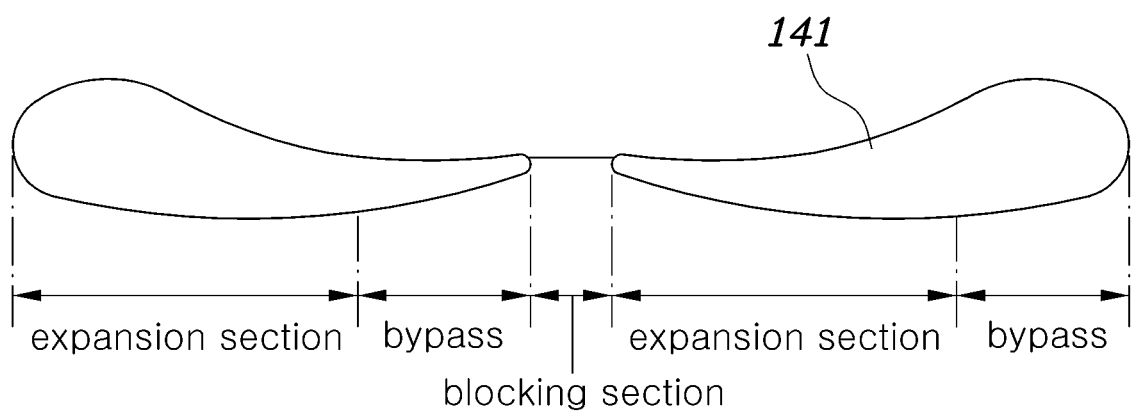

Further, as shown in FIG. 11, the rotary blade hole 141 of the second valve 140 extends in a circumferential direction of the second valve 140, and as the same extends, an open area thereof may be enlarged or reduced. Particularly, the open area thereof may be gradually reduced in a direction in which the rotary blade 141 extends, and may be gradually enlarged again after being blocked in some areas.

That is, the rotary blade hole 141 of the second valve 140 may be divided into an expansion section in which the relative size of the open area is reduced, a blocking section in which the open area is blocked, and a bypass section in which the relative size of the open area is enlarged.

Figure 12:
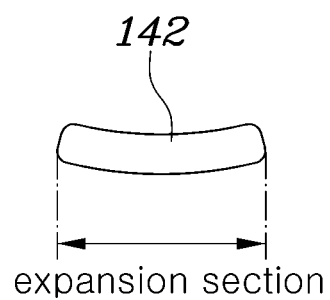

Additionally, as shown in FIG. 12, the rotary expansion hole 142 may extend in the circumferential direction of the second valve 140, and an open area thereof extending in the circumferential direction may have a uniform shape. Particularly, the rotary expansion hole 142 has a relatively short length compared to the rotary flow hole 132, and the entire area thereof extending in the circumferential direction may be an expansion section.

Figure 13:
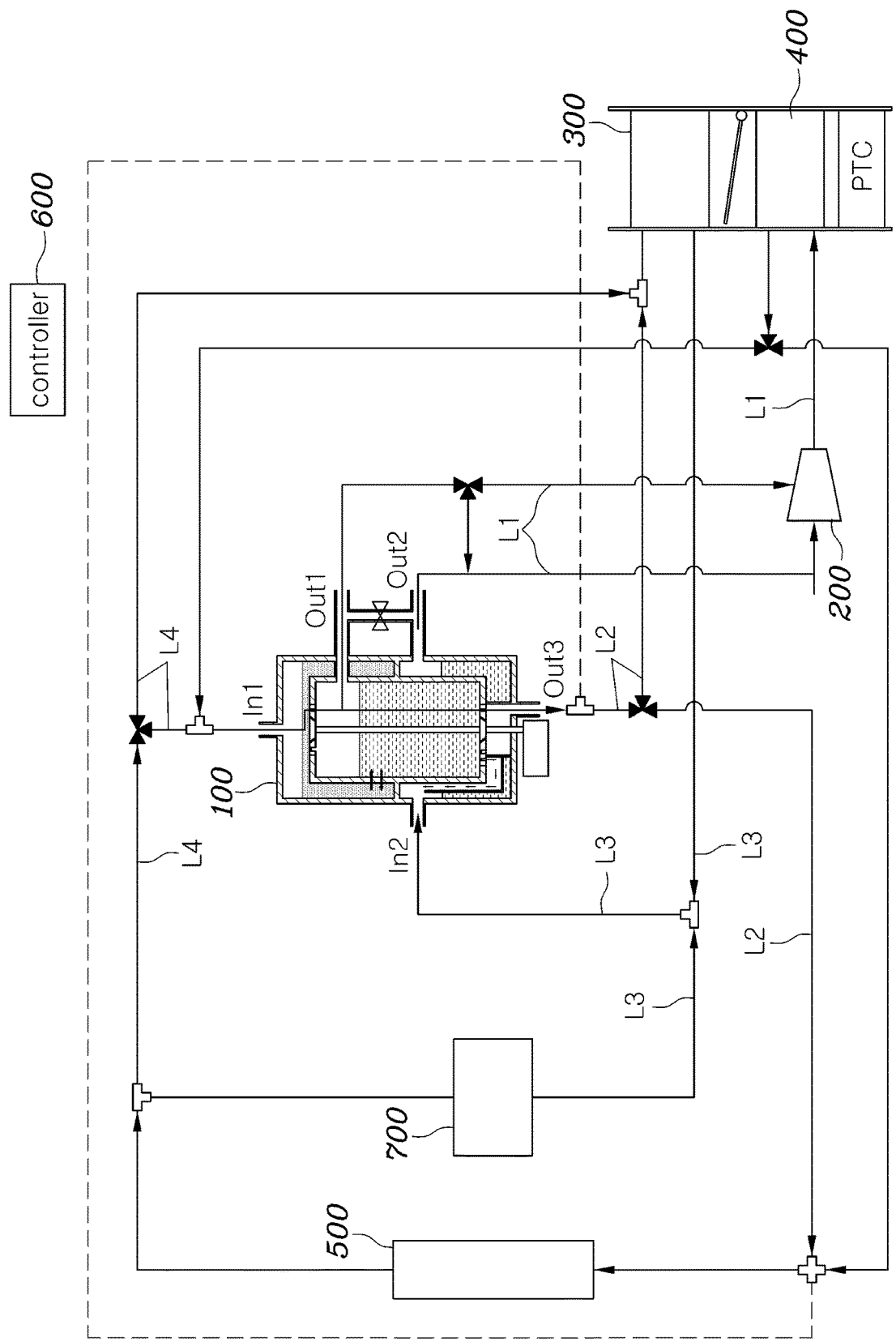
FIG. 13 is a circuit diagram of a thermal management system for a vehicle to which the injection-type heat exchange module according to the embodiment of the present disclosure is applied.

FIG. 13 is a circuit diagram of a thermal management system for a vehicle to which the injection-type heat exchange module 100 according to the embodiment of the present disclosure is applied.

Referring further to FIG. 13, the thermal management system for the vehicle to which the injection-type heat exchange module 100 according to the embodiment of the present disclosure is applied, includes a first refrigerant line L1 through which the refrigerant flows from the inner tank 120 and the lower chamber 112 of the outer tank 110 to the indoor condenser 400 via the compressor 200, a second refrigerant line L2 configured to branch from the inner tank 120 to the evaporator 300 and the external condenser 500 to allow the refrigerant to flow thereto, a third refrigerant line L3 through which the refrigerant flows from a chiller or the evaporator 300 to the lower chamber 112 of the outer tank 110, and a fourth refrigerant line L4 through which the refrigerant flows from the external condenser 500 and the indoor condenser 400 to the upper chamber 111 of the outer tank 110.

The refrigerant discharged from the inner tank 120 and the outer tank 110 of the injection-type heat exchange module 100 may flow to the compressor 200 through the first refrigerant line L1, and the refrigerant compressed in the compressor 200 may flow to the indoor condenser 400 through the first refrigerant line L1.

The refrigerant discharged from the inner tank 120 of the injection-type heat exchange module 100 may flow to the evaporator 300 through the second refrigerant line L2, or the second refrigerant line L2 may branch so that the refrigerant flows to the external condenser 500. A 3-way valve may be disposed at a branching point on the second refrigerant line L2 so that the direction of flow of the refrigerant is controlled by the controller 600 to be described later.

The refrigerant may flow into the lower chamber 112 of the outer tank 110 of the injection-type heat exchange module 100 from the chiller or the evaporator 300 through the third refrigerant line L3. Here, the chiller may be a device in which the flowing refrigerant exchanges heat with a coolant that cools an electrical component or a battery not shown in the drawing.

The refrigerant may flow into the upper chamber 111 of the outer tank 110 of the injection-type heat exchange module 100 from the external condenser 500 and the indoor condenser 400 through the fourth refrigerant line L4. The refrigerant discharged from the indoor condenser 400 may directly flow to the upper chamber 111 of the outer tank 110, or may flow to the upper chamber 111 of the outer tank 110 through the external condenser 500. The refrigerant passing through the external condenser 500 may flow to the upper chamber 111 of the outer tank 110 through the fourth refrigerant line L4, or may flow to the evaporator 300.

The thermal management system may further include the controller 600, configured to control the operation of the compressor 200 and to control the rotation of the actuator 150 to permit the flow of, expand, or block the flow of the refrigerant in the first valve 130 and the second valve 140.

The controller 600 according to the embodiment of the present disclosure may be implemented by an algorithm configured to control the operation of various components of a vehicle, a non-volatile memory (not shown) configured to store data related to software instructions that execute the algorithm, or a processor (not shown) configured to perform operations described below using the data stored in the memory. Here, the memory and the processor may be implemented as separate chips. Alternatively, the memory and the processor may be implemented as a single chip in which the memory and the processor are integrated with each other. The processor may take the form of one or more processors.

The controller 600 may control the actuator 150 to simultaneously rotate the first valve 130 and the second valve 140, and may additionally control the 3-way valve provided on the refrigerant line of the thermal management system for the vehicle, thereby controlling the direction of flow of the refrigerant through the refrigerant line.

Figure 14:
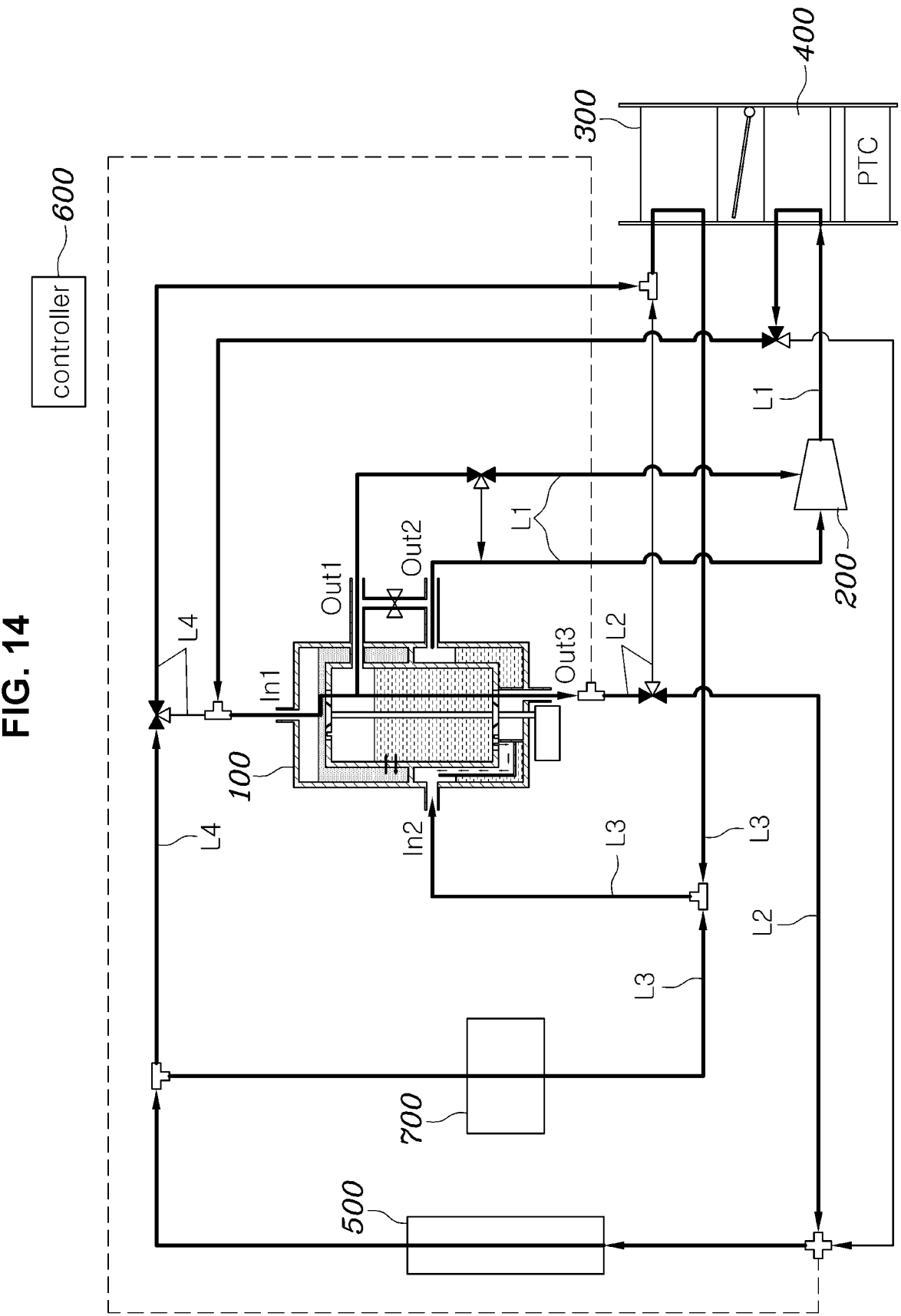
FIGS. 14, 15, and 16 are views showing an operation mode of the thermal management system for the vehicle to which the injection-type heat exchange module according to the embodiment of the present disclosure is applied.
Figure 15:
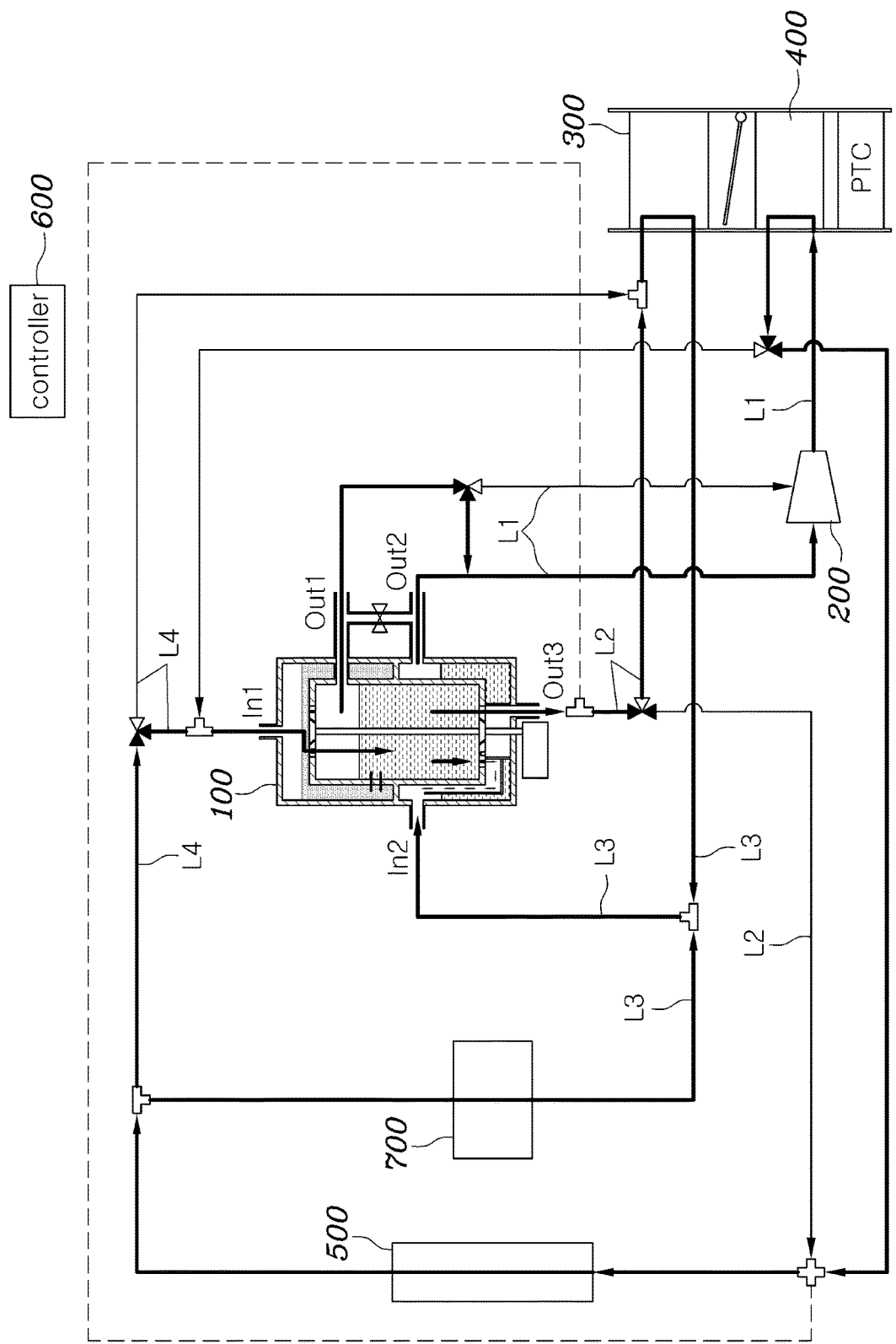
Figure 16:
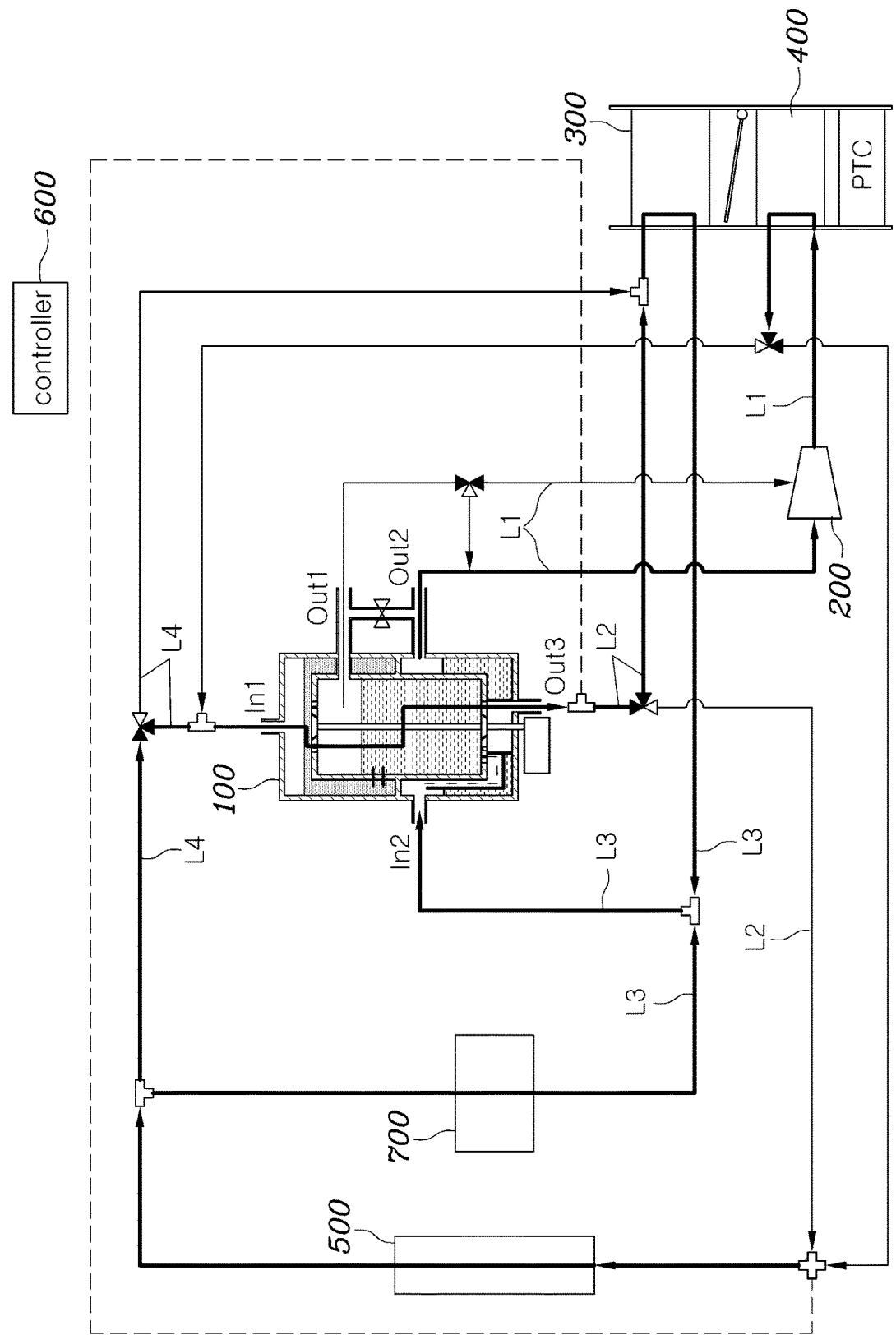

FIGS. 14 to 16 are views showing an operation mode of the thermal management system for the vehicle to which the injection-type heat exchange module 100 according to the embodiment of the present disclosure is applied.

Referring further to FIG. 14, the controller 600 may control, in the gas injection mode, the actuator 150 so that the first valve 130 causes the refrigerant in the upper chamber 111 of the outer tank 110 to be expanded in the inner tank 120 and the second valve 140 causes the evaporator 300 to expand the refrigerant in the inner tank 120 through the cooling hole 123, which communicates with the evaporator 300.

That is, in the gas injection mode, the first valve 130 may cause the refrigerant to be expanded in the fixing hole 121 at the upper end of the inner tank 120, and the second valve 140 may cause the refrigerant to be expanded in the cooling hole 123 at the lower end of the inner tank 120.

Additionally, referring further to FIG. 15, the controller 600 may control, in the liquid injection mode, the actuator 150 so that the first valve 130 causes the refrigerant in the upper chamber 111 of the outer tank 110 to flow into the inner tank 120 and the second valve 140 causes the lower chamber 112 of the outer tank 110 and the evaporator 300 to expand the refrigerant in the inner tank 120 through the injection hole 122 communicating with the lower chamber 112 of the outer tank 110 and the cooling hole 123 communicating with the evaporator 300.

That is, in the liquid injection mode, the first valve 130 may cause the refrigerant to flow through the fixing hole 121 at the upper end of the inner tank 120, and the second valve 140 may cause the refrigerant to be expanded in the injection hole 122 and the cooling hole 123 at the lower end of the inner tank 120.

In addition, referring further to FIG. 16, the controller 600 may control, in the general cooling mode, the actuator 150 so that the first valve 130 causes the refrigerant in the upper chamber 111 of the outer tank 110 to flow into the inner tank 120, and the second valve 140 causes the lower chamber 112 of the outer tank 110 and the evaporator 300 to expand the refrigerant in the inner tank 120 through the cooling hole 123 communicating with the evaporator 300.

That is, in the normal cooling mode, the first valve 130 may cause the refrigerant to flow through the fixing hole 121 at the upper end of the inner tank 120, and the second valve 140 may cause the refrigerant to be expanded in the cooling hole 123 at the lower end of the inner tank 120.

As is apparent from the above description, an injection-type heat exchange module of the present disclosure is a module in which a heat exchanger and a flash tank are integrated, and particularly includes a valve capable of controlling expansion or flow of a refrigerant using one actuator, thereby having an effect of simplifying a system configuration.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

The invention claimed is:

1. An injection-type heat exchange module comprising:
an outer tank comprising an upper chamber and a lower chamber separated from each other, the upper chamber being connected to an external condenser or an indoor condenser from which a refrigerant flows into, and the lower chamber being connected to an evaporator from which the refrigerant flows into, and the lower chamber being connected to a compressor from which the refrigerant is discharged;
an inner tank configured to exchange heat with the refrigerant in the outer tank and connected to the compressor, the evaporator, or a lower portion of the outer tank to discharge the refrigerant;
a first valve positioned at an upper end of the inner tank, the first valve being configured to cause the refrigerant in the upper chamber of the outer tank to be expanded in the inner tank, and to permit or block flow of the refrigerant when rotated;
a second valve rotatably coupled to a lower end of the inner tank and configured to cause the refrigerant in the inner tank to be expanded and then supplied to the evaporator, and to permit or block flow of the refrigerant when rotated, the second valve also causing the refrigerant to be expanded by the lower chamber of the outer tank or blocking the refrigerant when rotated; and
an actuator connected to the first valve and the second valve and configured to simultaneously rotate the first valve and the second valve;
wherein the inner tank extends in a vertical direction, a first part of the inner tank is located inside the upper chamber of the outer tank, and a remaining part of the inner tank is located inside the lower chamber, wherein the inner tank is configured to simultaneously exchange heat with the refrigerant in the upper and lower chambers of the outer tank.

2. The injection-type heat exchange module according to claim 1, wherein the inner tank is formed to maximize a surface area of a part or all of an outer surface of the inner tank.

3. The injection-type heat exchange module according to claim 1, wherein the inner tank is connected to the compressor at an upper portion of the inner tank, and the inner tank is configured to discharge gaseous refrigerant to the compressor, and the inner tank is connected to the evaporator at a lower portion of the inner tank to discharge the liquid refrigerant to the evaporator.

4. The injection-type heat exchange module according to claim 1, wherein the lower chamber of the outer tank is connected to the compressor at an upper portion to discharge gaseous refrigerant to the compressor.

5. The injection-type heat exchange module according to claim 1, wherein:
the first valve comprises a rotary blade hole and a rotary flow hole;
the inner tank comprises a fixing hole formed at an upper end; and
a position of the fixing hole relative to the rotary blade hole and the rotary flow hole is changed when the first valve is rotated relative to the inner tank.

6. The injection-type heat exchange module according to claim 1, wherein:
the second valve comprises a rotary blade hole and a rotary expansion hole;
the inner tank comprises an injection hole communicating with the lower chamber of the outer tank, and a cooling hole communicating with the evaporator formed at a lower end of the inner tank; and
a position of the injection hole and the cooling hole relative to the rotary blade hole and the rotary expansion hole is changed when the second valve is rotated relative to the inner tank.

7. The injection-type heat exchange module according to claim 5, wherein the rotary blade hole extends in a circumferential direction of the first valve or the second valve, and wherein the rotary blade hole has a size of an open area that increases or decreases along an extension direction thereof.

8. The injection-type heat exchange module according to claim 1, wherein, at a position where the first valve causes the refrigerant in the upper chamber of the outer tank to flow into the inner tank, the second valve causes the lower chamber of the outer tank and the evaporator to simultaneously expand and then supply the refrigerant to the inner tank through an injection hole communicating with the lower chamber of the outer tank and a cooling hole communicating with the evaporator, causes the evaporator to expand and then supply the refrigerant to the inner tank through the cooling hole in a state in which the lower chamber of the outer tank is blocked, or causes the lower chamber of the outer tank and the evaporator to be simultaneously blocked.

9. The injection-type heat exchange module according to claim 1, wherein, at a position where the first valve causes the refrigerant in the upper chamber of the outer tank to be expanded and then supplied to the inner tank, the second valve causes the evaporator to expand and then supply the refrigerant to the inner tank through a cooling hole communicating with the evaporator.

10. A thermal management system for a vehicle to which the injection-type heat exchange module according to claim 1 is applied, the thermal management system comprising:
a first refrigerant line through which the refrigerant flows from the inner tank and the lower chamber of the outer tank to the indoor condenser via the compressor;
a second refrigerant line configured to branch from the inner tank to the evaporator and the external condenser to allow the refrigerant to flow;
a third refrigerant line through which the refrigerant flows from a chiller or the evaporator to the lower chamber of the outer tank; and
a fourth refrigerant line through which the refrigerant flows from the external condenser and the indoor condenser to the upper chamber of the outer tank.

11. The thermal management system according to claim 10, further comprising a controller configured to operate the compressor and to control rotation of the actuator to permit flow of, expand, or block the flow of the refrigerant in the first valve and the second valve.

12. The thermal management system according to claim 11, wherein the controller controls, in a gas injection mode, the actuator so that the first valve causes the refrigerant in the upper chamber of the outer tank to be expanded and then supplied to the inner tank, and the second valve causes the evaporator to expand and then supply the refrigerant to the inner tank through a cooling hole communicating with the evaporator.

13. The thermal management system according to claim 11, wherein the controller controls, in a liquid injection mode, the actuator so that the first valve causes the refrigerant in the upper chamber of the outer tank to flow into the inner tank, and the second valve causes the lower chamber of the outer tank and the evaporator to simultaneously expand and then supply the refrigerant to the inner tank through an injection hole communicating with the lower chamber of the outer tank and a cooling hole communicating with the evaporator.

* * * * *